United States Patent [19]
Ericson et al.

[11] Patent Number: 5,748,628
[45] Date of Patent: May 5, 1998

[54] ISDN D-CHANNEL SIGNALING DISCRIMINATOR

[75] Inventors: Philip G. Ericson, West Hills; Ray M. Ransom, Big Bear City, both of Calif.

[73] Assignee: Interack Communications, Inc., Chatsworth, Calif.

[21] Appl. No.: 743,222

[22] Filed: Nov. 5, 1996

[51] Int. Cl.$^6$ .................................................. H04J 3/12
[52] U.S. Cl. ...................... 370/384; 370/466; 370/469; 370/524
[58] Field of Search ............................ 370/466, 467, 370/469, 385, 524, 384

[56] References Cited

U.S. PATENT DOCUMENTS

| | | | |
|---|---|---|---|
| 4,910,729 | 3/1990 | Coffelt et al. | 370/17 |
| 4,979,169 | 12/1990 | Almond et al. | 370/99 |
| 4,985,887 | 1/1991 | Mizuhara et al. | 370/58.2 |
| 4,998,274 | 3/1991 | Ephraim | 379/158 |
| 5,012,466 | 4/1991 | Buhrke et al. | 370/270 |
| 5,012,470 | 4/1991 | Shobu et al. | 370/110.1 |
| 5,062,108 | 10/1991 | Bales et al. | 370/110.1 |
| 5,134,611 | 7/1992 | Steinka et al. | 370/79 |
| 5,142,528 | 8/1992 | Kobayashi et al. | 370/79 |
| 5,182,748 | 1/1993 | Sakata et al. | 370/94.1 |
| 5,235,639 | 8/1993 | Chevalier et al. | 380/4 |
| 5,237,569 | 8/1993 | Sekihata et al. | 370/94.1 |
| 5,251,207 | 10/1993 | Abensour et al. | 370/60.1 |
| 5,278,972 | 1/1994 | Baker et al. | 395/500 |
| 5,305,312 | 4/1994 | Fornek et al. | 370/62 |
| 5,341,418 | 8/1994 | Yoshida | 379/399 |
| 5,425,029 | 6/1995 | Hluchyj et al. | 370/94.1 |
| 5,442,630 | 8/1995 | Gagliardi et al. | 370/402 |
| 5,479,405 | 12/1995 | Koz et al. | 370/84 |
| 5,483,530 | 1/1996 | Davis et al. | 370/79 |
| 5,537,417 | 7/1996 | Sharma et al. | 370/94.1 |
| 5,548,710 | 8/1996 | Oono et al. | 395/181 |
| 5,594,732 | 1/1997 | Bell et al. | 370/401 |
| 5,621,731 | 4/1997 | Dale et al. | 370/79 |
| 5,627,827 | 5/1997 | Dale et al. | 370/359 |

OTHER PUBLICATIONS

ISDN—A User'Guide to Services, Applications & Resources in California, Pacific Telesis Group, 1996, Pacific Bell.

CCIT Bluebook, vol. Vi—Digital Subscriber Signalling System No. 1 (DSS 1), Data Link Layer, Recommendations Q.920–Q.921, Cover page, and pages 28, 140 and 141.

*Primary Examiner*—Douglas W. Olms
*Assistant Examiner*—Min Jung
*Attorney, Agent, or Firm*—Small, Larkin & Kidde

[57] ABSTRACT

The present invention is a software implementation for the processing of ISDN signaling protocol independent of the equipment type and vendor variations of the CCITT Q.921/ Q.931 protocol specification with which it is connected, including at least one layer two filter and at least one layer three filter which are adapted to cooperate together to process ISDN D-channel signals independent of ISDN facility type.

25 Claims, 10 Drawing Sheets

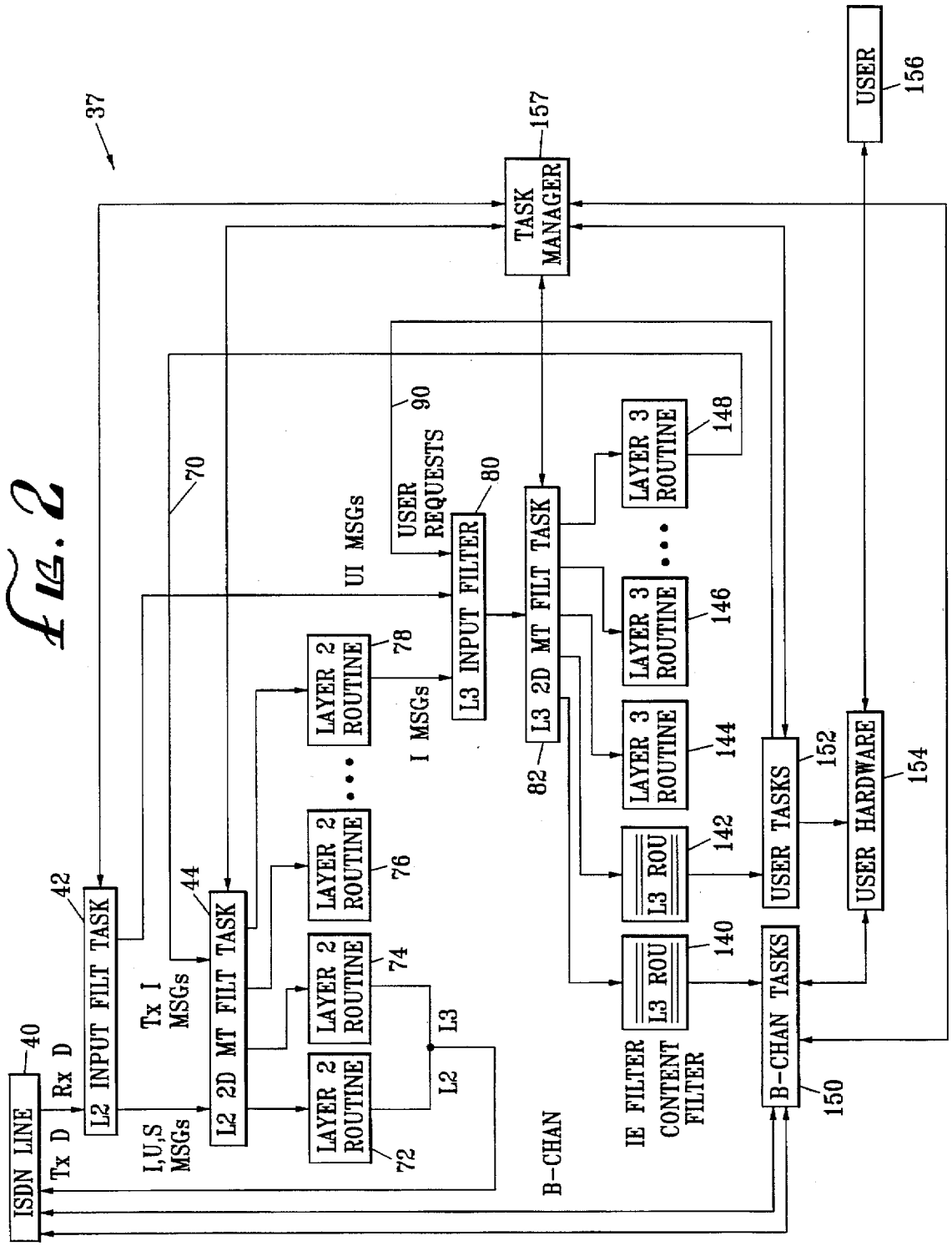

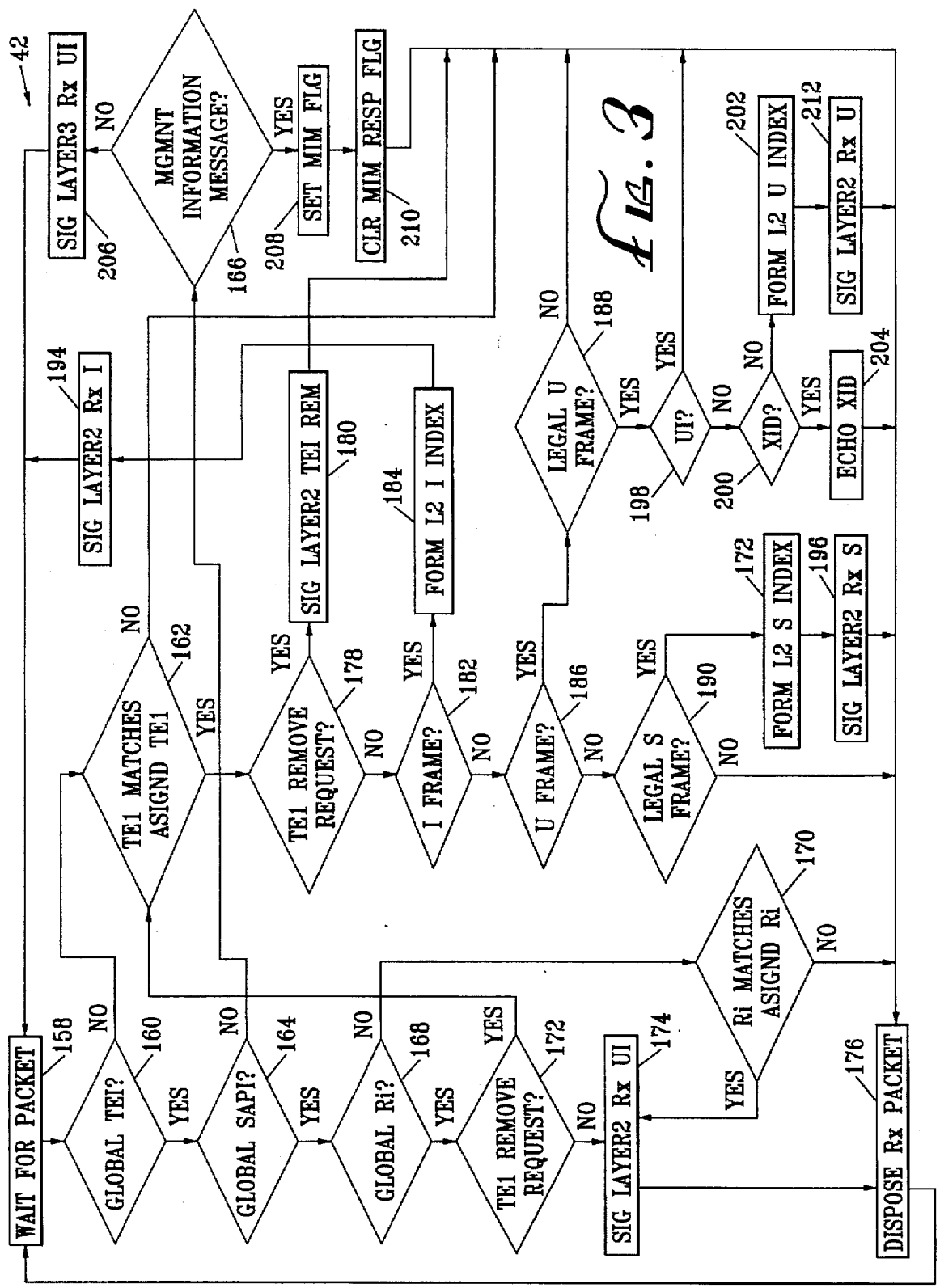

| INPUT EVENTS | | 46 ≈ GET TEI | 47 ≈ AWAIT TEST | 48 ≈ GET USID | 49 ≈ AWAIT REL | 50 ≈ MULTI FRM | 51 ≈ TIMER REC |
|---|---|---|---|---|---|---|---|
| 52 ≈ | DISCARD MESSAGE | D | D | D | D | D | D |
| 53 ≈ | Rx I MESSAGE | D | D | D | D | P | P |
| 54 ≈ | Tx I MESSAGE | D | D | D | D | P | P |
| 55 ≈ | TEI REMOVE | I | N | N | N | N | N |
| 56 ≈ | T200 EXPIRY | I | P | I | P | N | N |
| 57 ≈ | T202 EXPIRY | P | I | P | I | I | I |
| 58 ≈ | T203 EXPIRY | I | I | I | I | N | I |
| 59 ≈ | UI TEI MESSAGE | P | P | P | P | P | P |
| 60 ≈ | USID/TID ASSIGN | I | P | P | I | P | I |
| 61 ≈ | DM | I | P | P | P | P | P |
| 62 ≈ | DISC | I | P | P | P | N | N |
| 63 ≈ | UA | I | N | P | P | P | P |
| 64 ≈ | SABME | I | P | P | P | P | P |
| 65 ≈ | FRMR | I | I | P | I | N | N |
| 66 ≈ | RR | I | I | P | I | P | P |
| 67 ≈ | RNR | I | I | P | I | P | P |
| 68 ≈ | REJ | I | I | P | I | P | P |

D = DISPOSE MESSAGE (LEGAL BUT IGNORED)
I = IGNORE
N = NEW STATE
P = PROCESS EVENT AND REMAIN IN SAME STATE

- D = DISPOSE MESSAGE (LEGAL BUT IGNORED)
- E = ERROR (IGNORE)
- I = IGNORE
- N = NEW STATE
- P = PROCESS EVENT AND REMAIN IN SAME STATE

| INPUT EVENTS | | 84 NULL INIT | 85 CALL INIT SEND | 86 OVL SEND PROC | 87 CALL DEL RECV | 88 CALL ACTIVE RECV | 89 CONN REQ | 90 ACTIVE | 91 DISC IND REQ | 92 DISC REQ | 93 HOLD DREQ | 94 RETRV REQ | 95 RELEASE REQ |
|---|---|---|---|---|---|---|---|---|---|---|---|---|---|
| 100 | ON HOOK | I | N | N | N | N | P | N | N | I | N | I | I |
| 101 | OFF HOOK | N | I | I | I | I | N | I | I | I | I | I | I |
| 102 | B-CHANNEL RELEASE | I | N | N | N | N | P | N | N | I | I | I | I |
| 103 | B-CHANNEL REQUEST | N | I | I | I | I | N | I | I | I | I | I | I |
| 104 | DIAL | I | I | P | I | I | I | I | I | I | I | I | I |
| 105 | HOOKFLASH | I | I | I | I | I | I | I | N | I | I | I | I |
| 106 | T305 EXPIRY | I | I | I | I | I | I | I | I | N | I | I | I |
| 107 | T308 EXPIRY | I | I | I | I | I | I | I | I | I | I | I | N |
| 108 | T313 EXPIRY | I | I | I | I | I | I | N | I | I | I | I | I |
| 109 | DISABLE LAYER 3 | P | N | N | N | N | N | N | N | N | N | N | N |
| 110 | UNEXPECTED I-FRAME | E | E | E | E | E | E | E | E | E | E | E | E |
| 111 | UNRECOGNIZED I-FRAME | E | E | E | E | E | E | E | E | E | E | E | E |
| 112 | ESCAPE TO NATIONAL | P | P | P | P | P | P | P | P | P | P | P | P |
| 113 | ALERTING | E | E | N | N | E | E | E | E | E | E | E | E |
| 114 | CALL PROCEEDING | E | N | N | E | E | E | E | E | E | E | E | E |
| 115 | PROGRESS | E | E | P | P | E | E | E | E | E | E | E | E |
| 116 | SETUP | N | D | D | D | D | D | P | D | D | D | D | D |
| 117 | CONNECT | E | E | N | N | N | E | E | E | E | E | E | E |
| 118 | SETUP ACK | E | N | E | E | E | E | E | E | E | E | E | E |
| 119 | CONNECT ACK | E | E | E | E | E | E | N | E | E | E | E | E |
| 120 | DISCONNECT | E | E | N | N | N | N | N | N | N | N | N | E |
| 121 | RELEASE | P | E | N | N | N | N | N | N | N | N | N | N |
| 122 | RELEASE COMPLETE | D | N | N | N | N | N | N | N | N | N | N | N |
| 123 | HOLD REQUEST | E | E | E | E | E | E | N | E | E | E | E | E |
| 124 | HOLD ACK | E | E | E | E | E | E | E | E | E | N | E | E |
| 125 | HOLD REJECT | E | E | E | E | E | E | E | E | E | N | E | E |
| 126 | RETRIEVE REQUEST | E | E | E | E | E | E | N | E | E | E | E | E |
| 127 | RETRIEVE ACK | E | E | E | E | E | E | E | E | E | E | N | E |
| 128 | RETRIEVE REJECT | E | E | E | E | E | E | E | E | E | E | N | E |
| 129 | STATUS ENQUIRY | P | P | P | P | P | P | P | P | P | P | P | P |
| 130 | INFO | P | E | P | P | P | P | P | P | P | P | P | E |
| 131 | STATUS | P | P | P | P | P | P | P | P | P | P | P | P |
| 132 | NOTIFY | E | E | E | E | E | E | D | D | E | E | E | E |
| 133 | USER INFO | E | E | E | E | E | E | E | E | E | E | E | E |
| 134 | RESTART | E | E | E | E | E | E | E | E | E | E | E | E |
| 135 | RESTART ACK | E | E | E | E | E | E | E | E | E | E | E | E |
| 136 | SEGMENT | E | E | E | E | E | E | E | E | E | E | E | E |
| 137 | FACILITY | E | E | E | E | E | E | E | E | E | E | E | E |
| 138 | CONGESTION CONTROL | E | E | E | E | E | E | E | E | E | E | E | E |

Fig. 10

| CALLING PARTY | L2 | L3 | NETWORK | L3 | L2 | CALLED PARTY |
|---|---|---|---|---|---|---|
| TA POWER UP | | | | | | TA POWER UP |
| TEI REQUEST / TEI ASSIGNED | UI(63,127) TEI →<br>UI(63,127) TEI →<br>SABME(0,TEI) →<br>← UA(0,TEI) | | | | ← UI(63,127) TEI<br>← UI(63,127) TEI<br>← SABME(0,TEI)<br>UA(0,TEI) → | TEI REQUEST / TEI ASSIGNED |
| PLACE A CALL (OFF HOOK) DIAL TONE | ← RR(0,TEI) | ← I(0,TEI) SETUP<br>I(2,TEI) SETUP ACK → | | | | |
| FIRST DIGIT DIALED TONES OFF | RR(2,TEI) →<br>← RR(0,TEI) | I(0,TEI) INFO → | | | | |
| SUCCESSIVE DIGITS DIALED | RR(2,TEI) →<br>← RR(0,TEI)<br>RR(2,TEI) →<br>← RR(0,TEI)<br>○ ○ ○ | I(2,TEI) INFO →<br>I(0,TEI) INFO → | | | | |
| LAST DIGIT DIALED RINGBACK TONE ON | ← RR(0,TEI)<br>RR(2,TEI) →<br>← RR(2,TEI)<br>← RR(0,TEI) | I(0,TEI) INFO →<br>← I(2,TEI) CALL PROC<br>← I(2,TEI) ALERTING | ROUTE CALL<br>RINGING | UI(2,127) SETUP →<br>← I(0,TEI) CALL PROC<br>← I(0,TEI) ALERTING | RR(0,TEI) →<br>RR(0,TEI) → | INCOMING CALL<br>OPTIONAL<br>PHONE RINGING<br>OPTIONAL |
| TONES OFF / CALL ANSWERED | RR(2,TEI) →<br>← RR(0,TEI) | ← I(2,TEI) CONNECT<br>I(0,TEI) CONN ACK → | START CHARGING | ← I(2,TEI) STAT ENQ<br>I(0,TEI) STATUS →<br>← I(0,TEI) CONNECT<br>I(2,TEI) CONN ACK → | RR(2,TEI) →<br>← RR(0,TEI)<br>RR(0,TEI) →<br>← RR(2,TEI) | PHONE ANSWERED (OFF HOOK) |
| CALL IN PROGRESS | | | | | | |
| PHONE HUNG UP (ON HOOK) | ← RR(0,TEI)<br>RR(2,TEI) →<br>← RR(0,TEI) | I(0,TEI) DISC →<br>← I(2, TEI) RELEASE<br>I(0, TEI) REL COMP → | STOP CHARGING | ← I(2,TEI) DISC<br>I(0,TEI) RELEASE →<br>← I(2,TEI) REL COMP | RR(2,TEI) →<br>← RR(0,TEI)<br>RR(2,TEI) → | |

ISDN D-CHANNEL SIGNALING DISCRIMINATOR

BACKGROUND OF THE INVENTION

A. Field of the Invention

The invention is related generally to ISDN communication devices, and more particularly, to ISDN D-channel signaling devices for establishing and maintaining ISDN communications.

B. Description of the Prior Art

With the advent of high speed low cost microprocessors, there has been a rapid growth in the development of digital communication devices for the transmission of print, voice and video. The rapid growth and demand for such devices has quickly out paced the ability of the present communications infrastructure to provide the needed digital communication lines, such as fiber optic for individual users and businesses. One reason is the cost associated with replacing the existing copper lines to each household with fiber optic lines.

One solution gaining in popularity is the Integrated Services Digital Network (ISDN). ISDN is a set of protocols which allows for the digital transmission of signals across existing copper wires. The ISDN protocols are defined generally by the Consultative Committee for International Telephone and Telegraph (CCITT), which was recently renamed the Telecommunications Standards Sector of the International Telecommunications Union (ITU). Under these standards, a household or business with a single telephone line can use ISDN which can accommodate up to 128 thousand bits of data per second (Kbps). At 128 thousands bits per second up to two people can have two separate telephone conversations over the same phone line. More importantly, when connected to a personal computer, access to the Internet and remote computers is enhanced significantly over the existing modem connections. Such speeds also make video conferencing an inexpensive possibility. ISDN communication links are currently available in two types of user interfaces, namely, Primary Rate Interface (PRI) and Basic Rate Interface (BRI). Each of these interfaces includes a number of Bearer (B) channels which each operate at 64 Kbps. Each interface also includes a Signaling (D) channel which provides for both call set-up and user packet data across the ISDN line. In the case of BRI, two 64 Kbps B-channels and one 16 Kbps D-channel are used. When the two B-channels are combined data rates may reach up to 128 Kbps. In the case of PRI, 23 64 Kbps B-channels and one 64 Kbps D-channel are used in North America, 30 64 Kbps B-channels elsewhere. PRI is typically applied for commercial use and may be combined for large computing applications or divided among several different work locations within a facility. A more detailed overview of these principles can be found in the following publications: The Basics Book of ISDN, 2nd Edition, Motorola University Press, 1993 and Illustrated ISDN, Bo Lingren & Leif Jonsson, 2nd Edition, Infotrans, P.O. Box 939, S-391 29 Kalmar, Sweden. While ISDN demand is growing, driven by the demand for high speed digital communications, the reality is that ISDN growth has been slow. A major factor slowing the growth of ISDN is that there are slight, yet often critical differences, between the ISDN services. These differences stem from differences in the way the ISDN standard has been implemented by the major suppliers of ISDN equipment. Some of the more popular implementations of the ISDN standard are CCITT, AT&T, Bellcore, Northern Telecom, Korean Telecom and Siemens. Furthermore, additional differences are also found in different versions of each of these standards.

The call set-up and the associated data packet switching for each call is handled by the D-channel. The differences in the D-channel signals, caused by the slight, but often critical, differences in the various implementations of the CCITT ISDN standard, has made it difficult to establish and maintain communication using ISDN D-channel signaling.

In the past one solution to this problem has been to develop ISDN devices capable of identifying each of the known differences, using often complex program routines or sequential tests within the program routine which determine the viability of each D-channel signal, and then determine what action should be taken. The result is a slow, complex, and redundant software program implementation which is very difficult to debug.

An alternative solution requires configuring the ISDN device to respond to a predetermined implementation of the ISDN standard. However, such ISDN devices are not equipped to accommodate the differences among older or newer versions of an existing implementation of the ISDN standard. The result is that such devices often may require additional programming code after manufacture to tailor each for a specific use.

OBJECTS AND SUMMARY OF THE INVENTION

It is an object of the present invention to provide an improved ISDN device to establish and maintain ISDN D-channel signaling and accommodate differences in known implementations of the ISDN standard.

It is another object of the present invention to establish and maintain D-channel communication between ISDN devices through an ISDN facility switch irrespective of the implementation of the ISDN standard used.

An advantage of the present invention is the ability to provide D-channel communication using at least one set of application dependent signals with disregard for optional signals thereby eliminating the need for complex program routines.

Another advantage of the present invention is improved timing by eliminating the signals not needed, but transmitted during conventional D-channel communication.

A further advantage of the present invention is that it can be manufactured on an economical basis and has demonstrated portability between various ISDN D-channel signal standards with a reduced need for post-manufacture programming to tailor it for a specific use.

A further advantage of the present invention is the capability to discriminate between D-channel signals, to ignore differences in the D-channel signals which are required to establish and maintain communication, and to ignore or discard D-channel signals which are not required to establish and maintain communication and which are not otherwise desired.

The invention provides an ISDN device which substantially simplifies the D-channel signal traffic across an ISDN line and which significantly increases the ability to establish and maintain D-channel communication between ISDN devices. Moreover, the ISDN device of the present invention is relatively inexpensive to manufacture, trouble-free and highly reliable in use, and attains its improved result independently of the ISDN facility switch.

For purposes of the present invention the term discriminator is used to refer to the combined hardware and software implementation that processes signals on the ISDN D-channel in layers one, two and three as those layers are known and understood in this field. The discriminator of the present invention functions like a filter in that it receives numerous D-channel signals and "filters" them such that certain signals are passed through the filter for further processing, and the remainder are not passed through the discriminator for further processing.

In accordance with the present invention layer two and layer three signals are discriminated by a single set of software implementations that includes a layer two discriminator and a layer three discriminator, as will be described in greater detail below. In essence, then, the discriminator of the present invention includes two discriminators: one at layer two and one at layer three as illustrated in FIGS. 2–8 and described in detail in the accompanying text, these discriminators operate by identifying which signals belong to layer two and which signals belong to layer three, and then by using a two-dimensional vector matrix, or table for each layer to decide whether to eliminate, or further process specific signals. These tables are found in FIGS. 4 and 8, and their basic function is to associate incoming signals with subroutines that perform specific tasks related to establishing an ISDN communication. The way in which signals are initially processed and sent to the two tables is by processing, i.e., discriminating in the input filter tasks 42 and 80, illustrated in FIG. 2.

The main task of input filter task 42 is to look for U, S, I and UI messages. The U and S messages are indexed, and only the indexes of the U and S messages are sent to a layer two multi-tasking filter. The I messages are passed in their entirety to the layer two multi-tasking filter. UI messages are passed directly to the layer three multi-tasking filter. Once in the multi-tasking filter, the messages are applied to the respective tables, and queued by a WAIT subroutine until the appropriate processing routine is ready, after which a SIGNAL subroutine takes over to determine the fate of the message.

In general terms, the D-channel signal flow, i.e. the received message flow, is filtered by the two-part discriminator of the present invention as follows:

1. The receiver Interrupt Service Routine (ISR) wakes up a layer two input filter task by calling the task manager.
2. The layer two input filter task performs the filtering, i.e., separates UI signals from U, S and I signals, sends the UI signals to the layer three discriminator, and sends the U and S signal indexes and the I signals to the layer two multi-tasking filter as specified in FIG. 3.
3. Messages that pass through the layer two input filter are passed to either the layer two two-dimensional multi-tasking input event filter or the layer three two-dimensional multi-tasking input event filter signal subroutine by calling the multi-input signal routine, which is used layer two and layer three discriminators, as illustrated in FIGS. 3–8. Unnumbered Information (UI) messages are passed directly from the layer 2 input filter to layer three and Information (I) messages are passed to layer three via layer two multi-tasking input event filter. In the case of Unnumbered (U) messages and (S) Supervisory messages, only the input event index is passed to layer two, because the content of the message is implicit in the message type. This is why the layer two activity matrix of FIG. 4 uses the terms "discard" and "ignore".
4. The SIGNAL routine for layer two and layer three messages will do one of three things. It will (a) throw the incoming message away, (b) wake up the task in the proper conventional software routine for the current state and incoming message type or c) queue the input event because the task is currently running.

At layers two and three the tasks are suspended when they have nothing to do. This is accomplished by calling the WAIT routine as described in connection with FIGS. 3 and 5. Transmitted messages, i.e., those that are passed through the filter are not discussed in detail because they are not handled in any way which extends the state of the art.

The ISDN device of the present invention incorporates a single, serial discriminator chain composed of software tasks and an enhanced multi-tasking kernel, the enhancements of which are shown in FIGS. 5 and 6, which together form a system which discriminates and interprets received D-channel messages and other input events, thereby determining what action should be taken on a message by message basis. It is believed that the single, serial discriminator chain of the present invention consumes only a tiny fraction of the available processor bandwidth i.e., CPU cycles, in comparison to state of the art devices. By extending the multi-tasking kernel so that it has the capability to awaken a discriminator task with its program counter (PC) pointing to the software routine which corresponds to the current condition of the device and only when an event has occurred which is appropriate for the current condition of the device, all decision making is automatically incorporated into the discriminator.

Preferably, the discriminator includes a single layer two input filter task (also commonly referred to as Link Access Procedure D-channel (LAPD) filter), a layer two two-dimensional multi-tasking input event filter task for each layer two entity, a conventional layer three input filter subroutine, a layer three two-dimensional multi-tasking event filter task for each layer three entity, a SIGNAL subroutine which allows tasks to signal the occurrence of an input event for one of the layer two two-dimensional multi-tasking event filter tasks, a WAIT subroutine which allows each layer two two-dimensional multi-tasking event filter task to test for pending input events and suspend itself if there are none, corresponding WAIT and SIGNAL subroutines for the layer three two-dimensional multi-tasking event filter tasks and conventional software filters within layer three for the Information Elements (IEs) and the content within. In the present embodiment, the conventional layer three input subroutine is made a part of the layer three input event SIGNAL routine.

As D-channel messages are received by the ISDN device or input events are signaled by other tasks or background processing, an attempt is made to pass each of these input events through the discriminator chain. The discriminator chain is essentially an architecture which may also be referred to as a bank or as a set of discriminators and/or filter and/or software routines. The failure of an event or a component of an event to pass through any level of the discriminator chain, results in that input event being disregarded. Input events that pass successfully through a discriminator level are either processed at that level or passed on to the next level.

At layer three, the various D-channel signals may contain Information Elements (IEs) and element specific content, e.g. data. The number of IEs that are processed is limited by simply limiting the list of viable ones for a given embodiment of the invention. For example, in the preferred embodiment described herein, eleven are used. These eleven have been found to be useful. All others are simply ignored. For the IEs that are processed further, that is, not ignored, conventional subroutines are used. These IEs are processed in the subroutines, which are called from the software routines which correspond to the layer three state and input events which may expect a certain IE. The content, itself, of these messages is not filtered. Only those commands within each IE that are useful to the present invention are further processed, and the actions specified by the commands are only performed if the commands are present. Thus, for those D-channel signals which are successfully passed through the layer three filters, conventional layer three software subroutines are triggered and further process the signals in a conventional manner. These layer three subroutines cooperate with the conventional B-channel handler and user task handler.

The present invention, as a whole, is adaptable for use in a variety of ISDN devices, for example, in a terminal adapter, a digital switch, a multiplexer, and video conferencing unit. In fact, any device that communicates via the ISDN D-channel is able to use the discriminators of the present invention.

The portion of the present invention comprising the two-dimensional multi-tasking input event filters is adaptable for use in any device which have multiple states of operation and multiple input events for each state.

In the presently preferred embodiment of the invention, the discriminator is adapted for use in a terminal adapter. The terminal adapter hardware circuit includes generally a microcontroller having memory and a computer bus, means for connecting to a personal computer, means for connecting to an ISDN line and means for connecting to local analog telephones. In similar devices the power supply and ringer circuitry have been known to break down well before any other portion of the hardware circuitry. As part of the present invention, therefore, the hardware circuitry is powered by a removable, combined power supply and ringer circuit. By placing these conventional components on a removable board the useful life of the hardware circuit is significantly increased.

These and other objects and advantages of the invention will become apparent from the following more detailed description when taken in conjunction with the accompanying drawings of illustrative embodiments.

BRIEF DESCRIPTION OF THE DRAWINGS

FIG. 2 is a block diagram of the layer two and layer three discriminators of the present invention.

FIG. 3 is a flow chart of the layer two LAPD input filter task of the present invention.

FIG. 4 is a table of the layer two vector table portion for the two-dimensional multi-tasking input event filter.

FIG. 8 is a table of the layer three vector table portion for the two-dimensional multi-tasking input event filter.

FIG. 10 is a table illustrating the D-channel signal traffic needed to make a conventional telephone call.

DESCRIPTION OF THE PREFERRED EMBODIMENTS

Figure 1:
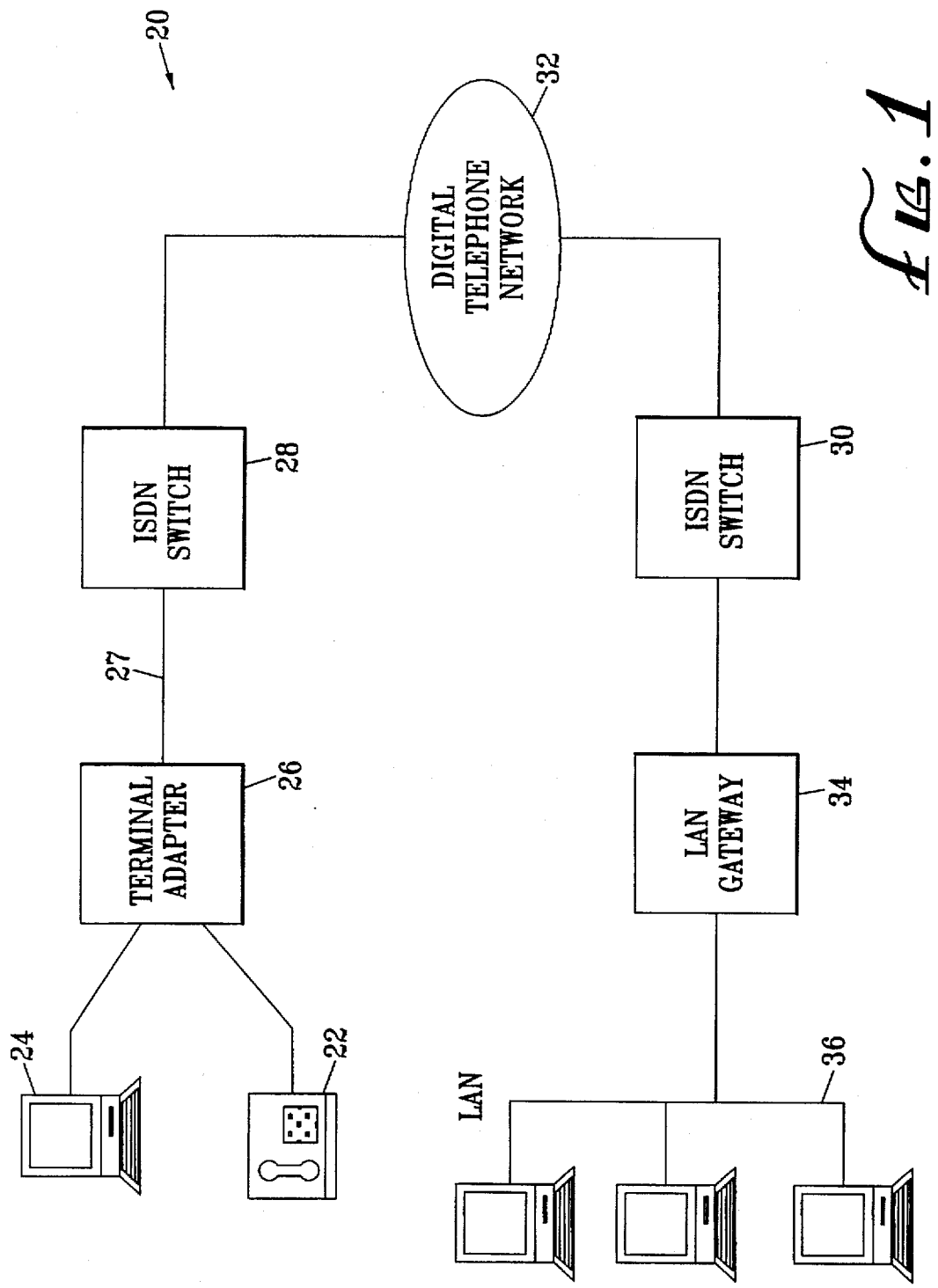
FIG. 1 is a schematic representation of a typical ISDN network configuration including a preferred embodiment terminal adapter of the present invention.

In the following description, like reference numerals will be used to refer to like or corresponding elements in the different figures of the drawings for the purpose of illustration.

The preferred embodiment described herein is a software implementation based on a 32-bit microprocessor. It is recognized that the principles of the present invention may be used with other processors.

FIG. 1 illustrates one example of an ISDN BRI connection using two 64 Kbps B-channels and one 16 Kbps D-channel. In this example, the ISDN connection 20 connects an individual to an office network 36 from home. Located at home, the ISDN circuit may provide an out-going line for one or more conventional analog telephone(s) 22 and one or more personal computer(s) 24. The telephone(s) 22 and computer(s) 24 are each connected to a ISDN terminal adapter 26 which translates the signals between the ISDN line 27 and the conventional telephone(s) 22 and personal computer(s) 24. The terminal adapter 26 connects to a first ISDN switch 28 which is part of an ISDN facility through a standard two-copper-wire (or twisted-pair) line 27 entering the house. The first ISDN switch 28 connects to a second ISDN switch 30 servicing the area where the office is located through the existing digital telephone network 32. In this example, the ISDN switch connects to the office through a local area network (LAN) gateway 34. Using this configuration, the user at home has access to the office network 36 at speeds of up to 128 Kbps when using both B-channels of the BRI connection to connect to the office. Or, alternatively, the user can connect to the office at 64 Kbps using one B-channel and use the second B-channel for phone or facsimile communication to another digital or analog telephone or facsimile through the existing digital telephone network.

The establishment of communication between the terminal adapter, the first and second ISDN switch and the LAN gateway is predicated upon each of these devices understanding the D-channel signals transmitted across the line. These D-channel signals are defined generally by The International Telegraph and Telephone Consultative Committee, Digital Subscriber Signaling System Number 1, Data Link Layer, Recommendation Q.921, and Network Layer, Recommendation Q.931, Geneva, 1989 (the CCITT Standard). However, in each ISDN switch, the CCITT Standard may be implemented with differences in the D-channel signals that cause slight, but often critical differences in some of the D-channel signals transmitted.

Before proceeding with a detailed description of the present discriminator, it should be recognized that the present invention may be utilized in a variety of ISDN devices. Because such systems utilize a variety of hardware and programming techniques, no attempt is made to describe the conventional hardware and programs used to control the ISDN devices. It should be noted that the present invention must be incorporated into the overall structure of the device in which it is used and should be tailored to integrate with other features and operations of the device. Thus, in order to avoid confusion and in order to enable those skilled in the art to practice the claimed invention, this specification will describe the operation of the discriminator using FIGS. 2–8 and taken in the context of a terminal adapter hardware block diagram of FIG. 9.

In accordance with the present invention, FIG. 2 depicts an illustrative block diagram of the serial, single serial discriminator chain or bank 37 useful in describing the operation of said invention.

When an input signal is received across the ISDN line 40, which corresponds to line 27 of FIG. 1, the system hardware generates an interrupt, the ISR (Interrupt Service Routine) of which places a pointer to the received message in the D-channel receive message queue, increments the D-channel received message count and signals the task scheduler. The task scheduler in turn awakens the layer two input filter task 42 by linking it to the active task queue. The above processing is accomplished with conventional hardware and software implementation which are known and readily adapted to be used with the invention as presently disclosed.

The operation of the layer two input filter task 42 is shown in the FIG. 3 flow chart and described in detail below, but generally, does one of three things upon being awakened by the reception of a D-channel message. If the received D-channel message is a legal I, S, or U message, it is passed to the layer two two-dimensional multi-tasking input event filter 44 by calling the layer two two-dimensional multi-tasking input event filter SIGNAL subroutine. The operation of the SIGNAL subroutine is shown in the FIG. 6 flow chart and described in detail below.

Figure 6:
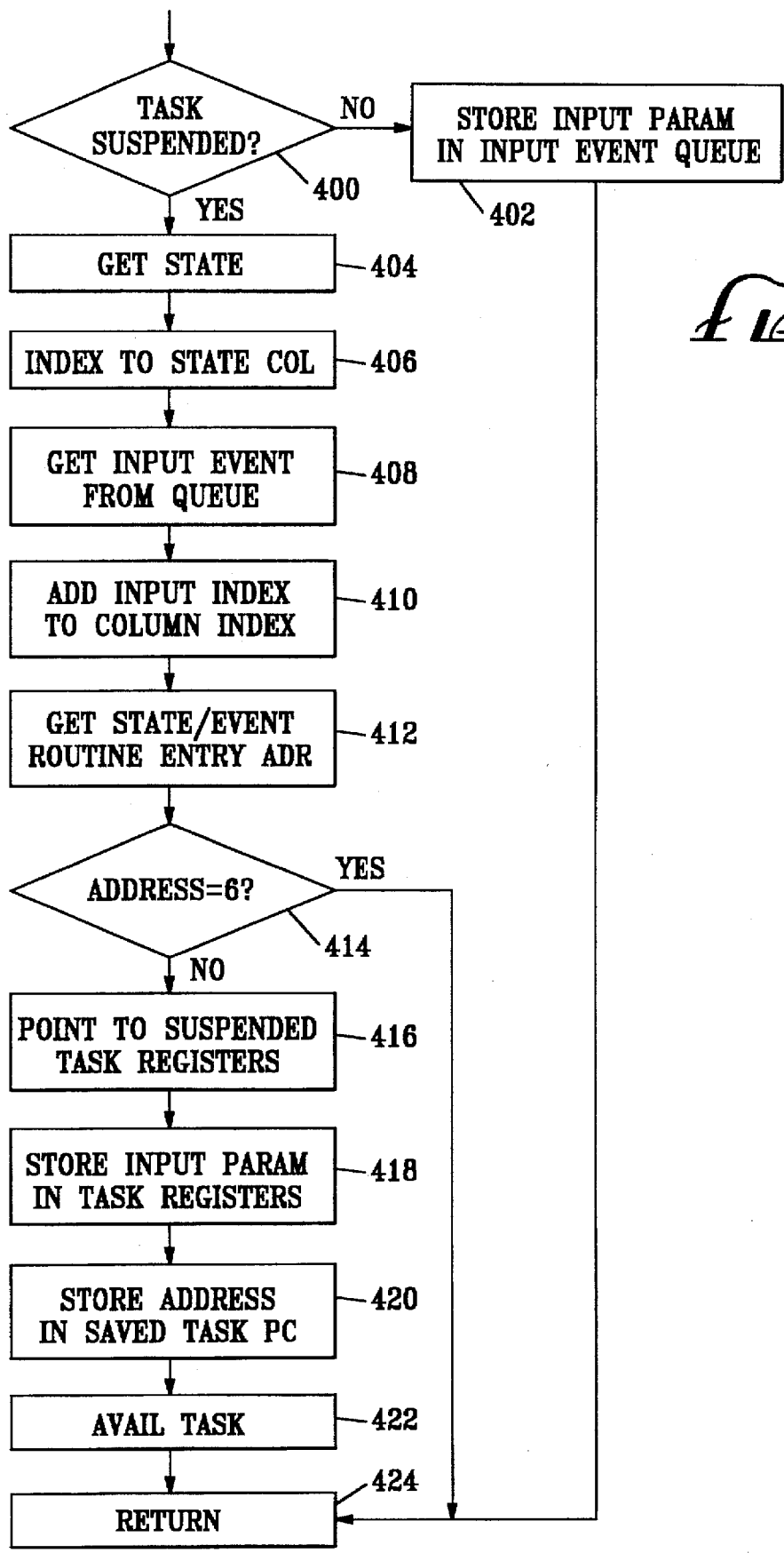
FIG. 6 is a flow chart of the event signaling extension of the multi-tasking kernel for the layer two and layer three.

If the received D-channel message is a legal UI message, it is passed to the layer three two-dimensional multi-tasking input event filter 80 by calling the layer three conventional input filter subroutine, which falls into the layer three two-dimensional multi-tasking input event filter SIGNAL subroutine. The operation of the SIGNAL subroutine is same as the corresponding layer two subroutine, as shown in FIG. 6. Any other messages are rejected and their buffers returned to their buffer pools. In the case of I and UI messages, a pointer is used to pass messages from one task to another. In all other cases (S and U messages) only a token is passed and the message buffers are returned to their pools.

Once the layer two input filter task 42 has passed or rejected a message, it signals the task manager that it has nothing to do. The task manager either suspends the input filter task or restarts it, depending on whether there are any accumulated received D-channel messages in the received D-channel message queue. This is accomplished by using a conventional multi-tasking I/O WAIT/SIGNAL semaphore mechanism and conventional multi-tasking kernel subroutine calls.

The layer two input filter 42 and the multi-tasking input event filter 44 use a two-dimensional vector table having columns 46-51 representative of the all possible layer two states of operation and rows 52-68 representative of all possible input events, as represented by FIG. 4, and a collection of software routines. Each table entry contains zero if the input event/state combination for that cell is illegal, requires no processing or is not necessary to fulfill the function of establishing and maintaining D-channel communication. The remaining table entries contain the address offset from the base of the table to the software routine that corresponds to the input event/state combination for that table entry.

An input event is passed to the layer two two-dimensional multi-tasking input event filter 44 by calling the layer two two-dimensional multi-tasking input event filter SIGNAL subroutine, which is shown in FIG. 6 and described in detail below. Generally, the layer two two-dimensional multi-tasking input event filter SIGNAL subroutine does one of three things. It returns after having done nothing, signals the task scheduler to awaken the layer two two-dimensional multi-tasking input event filter task with the PC pointing to the software routine which corresponds to the current layer two state and input event, or it stores the input event in the layer two two-dimensional multi-tasking input event filter input event queue and increments the layer two two-dimensional multi-tasking input event filter input event queue count.

Figure 5:
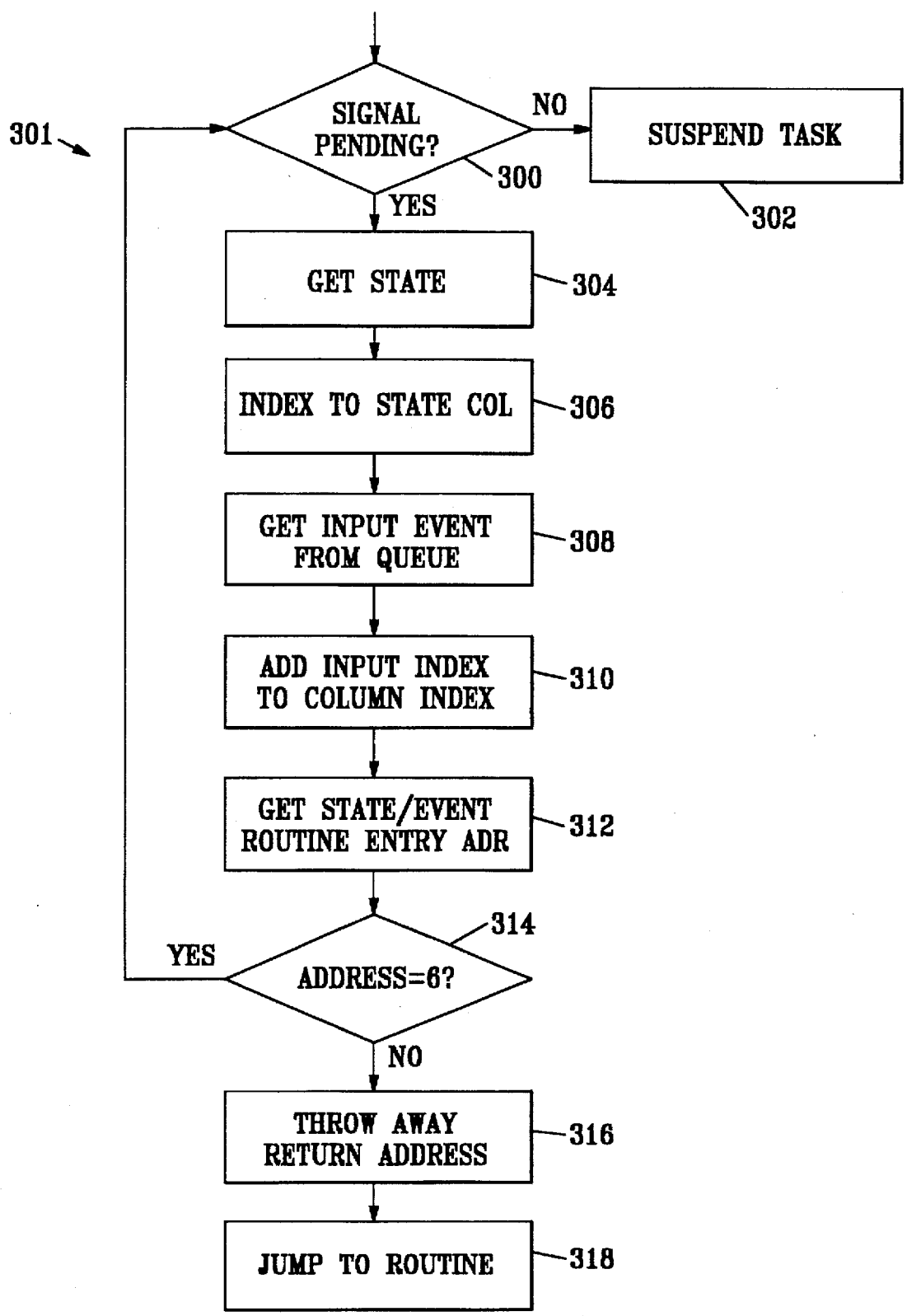
FIG. 5 is a flow chart of the task wait extension of multi-tasking kernel for layer two and layer three.

The software routines in the collection of routines 72-78 of the layer two two-dimensional multi-tasking input event filter are conventional except that the last operation performed by each routine is to call the layer two two-dimensional multi-tasking input event filter WAIT subroutine, which is shown in FIG. 5 and described in detail below. Generally, the layer two two-dimensional multi-tasking input event filter WAIT subroutine does one of two things. It suspends the layer two two-dimensional multi-tasking input event filter task or restarts it, depending on whether there are any accumulated layer 2 two-dimensional multi-tasking input event filter input events in the layer two two-dimensional multi-tasking input event filter input event queue. This ensures that the layer two two-dimensional multi-tasking input event filter task is only active when it is necessary to process a legal input event for the current layer two state and that the task automatically suspends itself when there are no input events in the queue.

This architecture, shown in FIG. 2, allows all layer two processing and decision making to be done inside the layer two two-dimensional multi-tasking input event filter task with no polling, no sequential comparisons and no conditional branching. This filter task 44 is conventional only in that it incorporates conventional routines. It is believed to be novel in that it also incorporates the two-dimensional matrix or vector table of FIG. 4, and its relationship with the WAIT and SIGNAL subroutines. These subroutines are illustrated in FIGS. 5 and 6. During operation, a device of the present invention, filter task 44 is awakened, automatically running the correct routine for the current state and the event which woke it up. The two-dimensional vector table has the added benefit of being a most helpful debugging aid by instantly and concisely telling the programmer what routine is invoked, if any, for each combination of layer two state and input event.

Aside from the messages passed from the layer two input filter task 42, input events passed to the layer two two-dimensional multi-tasking input event filter task also consist of I messages to be transmitted to the ISDN line 40, which originate in layer three. The transmission path, as shown in FIG. 2, is via path 70, filter task 44 and layer two routine 74. These messages are passed from the layer three two-dimensional multi-tasking input event filter task routines 140-148, with the path 70 shown as originating in routine 148. Although not shown, timer timeouts, are also passed from the task manager background processing to the layer two two-dimensional multi-tasking input event filter task 44.

The layer three two-dimensional multi-tasking input event filter task 82 and associated routines 140-148 are identical in function to corresponding layer two filter 44 and routines 72-78 except for four differences, described below.

The layer three two-dimensional multi-tasking input event filter 82 uses a different vector table than the layer two filter 44. The layer three table is shown in FIG. 8 and has columns 84-95 representative of the all possible layer three states of operation and rows 100-138 representative of all possible input events. The states and the input events are all different from those used by the layer two two-dimensional multi-tasking input event filter 44.

Some software routines in the collection of routines 140–148 contain additional conventional software filters, in the form of called subroutines, that discriminate the layer three message IEs and their content in a conventional manner. In the present embodiment, it is preferred that a minimal set of the following eleven IEs are processed, because it is only these eleven that are required. In accordance with the principles of the present invention, the set of IEs that are processed may be varied, in relation to the intended application.

The following list of IEs are used in the preferred embodiment, which is the best mode of practicing the invention.

Bearer Capability
Cause
Call State
Channel ID
Progress Indication
Initialization Request
Signal
Assign USID/TID
Called Party Number
Shift
Sending Complete The layer three two-dimensional multi-tasking input event filter SIGNAL subroutine 401 has an additional preprocessing block which is not a part of the layer two SIGNAL routine. This processing block is the layer three input filter 80, which is illustrated in the FIG. 7 flow chart and described in detail below. Generally, the layer three input filter 80 is a conventional software filter that passes legal I messages from layer two, subroutine 78, UI messages from layer two input filter 42 and which signify an incoming call, UI messages with an embedded "Escape to National" IE to the SIGNAL routine 401 and discards all other messages.

Referring to FIG. 2, the sources of input events which are passed to the layer three two-dimensional multi-tasking input event filter 82 are different from the input sources which pass input events to layer two filter 44. The sources for layer three input events are the layer two input filter task 42 output, via path 90, the user tasks 152 and some of the layer two two-dimensional multi-tasking input event filter routines only one of which is shown 78.

In the preferred embodiment, the B-channel tasks 150 are conventional software tasks, routines and ISRs that handle data communications across the B-channels. Some of the software routines of the layer three two-dimensional multi-tasking input event filter 82 are conventional IE filters and content filters, only one of which is shown at 140. The B-channel tasks associated with a particular B-channel are suspended when their respective B-channel is used for voice communication. Similarly, the user tasks 152 are conventional in nature and service the analog telephone connections and personal computer interface connections to the user 156, through the user hardware 154.

The task manager 160, which includes a task scheduler, a periodic interrupt time-slice processor, a system timer manager and an I/O wait/signal processor is conventional, except for the layer two and layer three two-dimensional multi-tasking input event filter WAIT and SIGNAL extensions, which are shown in FIGS. 5 and 6 respectively, and described in detail below.

In accordance with the present invention, FIG. 3 depicts a detailed flow diagram of the layer two input filter task 42 shown in FIG. 2.

With reference to FIG. 3, the software task is by default in step 158, in which it is suspended until a D-channel message is received from the ISDN line. Upon receipt of a message, the task will be awakened by the task manager and begin execution at step 160, where the value of the Terminal Endpoint Identifier (TEI) byte of the received message is checked to see if it is global.

If the TEI is global, the value of the Service Access Point Identifier (SAPI) is checked to see if it is global in step 164. If the SAPI is not global, the message it tested to see if it is a Management Information Message (MIM) at step 166. If the message is not a MIM, it can only be a UI message, so it is passed to the layer three input filter 80 in step 206 and the program jumps back up to step 158, where it suspends itself until another D-channel message arrives. MIM messages cause the MIM flag to be set in step 208 and the MIM response flag to be cleared at step 210. Then they are discarded in step 176 and the program jumps back up to step 158, where it suspends itself until another D-channel message arrives.

Messages with SAPIs which are not global fall through the test at step 164 into step 168, where they are checked to see if they contain a global random identifier (Ri). If the Ri is not global, the program jumps to step 170 to check whether the Ri matches an assigned Ri. If there is no match, the message is discarded in step 176 and the program jumps back up to step 158, where it suspends itself until another D-channel message arrives. Messages containing an assigned Ri are presumed to be UI TEI messages. A token signifying this is created and passed to the layer two two-dimensional multi-tasking input event filter 44 in step 174. The message is discarded in step 176 and the program jumps back up to step 158, where it suspends itself until another D-channel message arrives.

A message with a non-global Ri falls through the test at step 168 into step 172, where it is checked to see if it is a "TEI remove request" UI message. If it is, program execution is transferred to step 162.

A message which is not a "TEI remove request" UI message falls through the test at step 172 into step 174, where it is presumed to be a UI TEI message. A token signifying this is created and it is passed to the layer two two-dimensional multi-tasking input event filter 44 in step 174. The message is discarded in step 176 and the program jumps back up to step 158, where it suspends itself until another D-channel message arrives.

Messages with TEIs which are not global and "TEI remove request" UI messages have their TEIs compared to assigned TEIs in step 162. If the message TEI does not match any assigned TEIs, the message is discarded in step 176 and the program jumps back up to step 158, where it suspends itself until another D-channel message arrives. Otherwise, it is checked, once again, to see if it is a "TEI remove request" UI message in step 178. If it is a remove request, a token signifying this is created and passed to the layer two two-dimensional multi-tasking input event filter 44 in step 180. The message is discarded in step 176 and the program jumps back up to step 158, where it suspends itself until another D-channel message arrives.

Messages which pass through the tests in steps 162 and 178 are I, S or U messages with TEIs recognized as having been assigned to a specific layer two/layer three entity. A test is performed in step 182 to isolate I messages. For I messages, layer two input event indexes are created in step 184 by adding a constant to the I message type, the I message is passed to the layer two two-dimensional multi-tasking input event filter 44 in step 194 and the program jumps back up to step 158, where it suspends itself until another D-channel message arrives.

Messages which are not I messages are tested to see if they are U messages in step 186. If they are, they are tested for legal format in step 188. Illegal U frames are discarded in step 176 and the program jumps back up to step 158, where it suspends itself until another D-channel message arrives.

While it is theoretically possible to have a UI message with a specific TEI, they are believed to not occur in practice and are not necessary to maintain D-channel communication. Consequently, they are disposed of in the same manner as illegal U messages in step 198, where U messages are checked to see if they are UI messages.

Legal U messages are further checked in step 200 to see if they are XID messages. If they are, they are echoed back, as received, to the ISDN sender in step 204, discarded in step 176 and the program jumps back up to step 158, where it suspends itself until another D-channel message arrives.

Remaining U messages cause a layer two input event index to be created in step 202 by adding a constant to the U message type. The index is passed to the layer two two-dimensional multi-tasking input event filter 44 in step 212, the message is discarded in step 176 and the program jumps back up to step 158, where it suspends itself until another D-channel message arrives.

Messages which pass through the tests in steps 182 and 186 are tested in step 190 to see if they are legal S messages. If they are not, they are unrecognized messages which are discarded in step 176 and the program jumps back up to step 158, where it suspends itself until another D-channel message arrives. Legal S messages cause a layer two input event index to be created in step 192 by adding a constant to the S message type. The index is passed to the layer two two-dimensional multi-tasking input event filter 44 in step 196, the message is discarded in step 176 and the program jumps back up to step 158, where it suspends itself until another D-channel message arrives.

In accordance with the present invention, FIG. 4 is an illustrative chart that depicts all layer two states, all layer two two-dimensional multi-tasking input event filter input events and what action, if any, is taken by the layer two two-dimensional multi-tasking input event filter 44 for all possible combinations of layer two states and input events. This is useful to further understand the operation of the layer two two-dimensional multi-tasking input event filter 44 of FIG. 2.

Listed across the top of FIG. 4 are the layer two states of the present embodiment 46–51. It has been determined, that the first four layer two states recommended in the CCITT Q.921 specification could be collapsed into one state. The GET TEI state 46 of the present embodiment is equivalent to the Q.921 recommended states: 1) NO TEI ASSIGNED, 2) ASSIGN AWAITING TEI, 3) ESTABLISH AWAITING TEI and 4) TEI ASSIGNED. The remaining four CCITT states, 5) AWAITING ESTABLISHMENT 47, 6) AWAITING RELEASE 49, 7) MULTIPLE FRAME ESTABLISHED 50 and 8) TIMER RECOVERY 51 have been incorporated into the present embodiment as recommended by the CCITT. A new state, not a part of the Q.921 recommendation, GET USID/TID 48 was added to maintain equivalent operation across the complete range of activity required to fulfill the requirements of the ISDN D-channel layer two function.

In the left column of FIG. 4 are the input events to layer two 52–68 of the present embodiment, which, preferably includes the following set of input events to the layer two two-dimensional multi-tasking input event filter 44. These are believed to be required to establish and maintain D-channel communication, and are discussed below. These terms are either conventional, i.e., from the CCITT protocol or their functions are implicit in their names and following description.

DISCARD FRAME 52 is used by layer two itself to flush the input and output D-channel message queues in the event of a protocol error (e.g. wrong sequence number) in a manner consistent with the multi-tasking nature of the layer two two-dimensional multi-tasking input event filter 44.

RECEIVE I-FRAME MESSAGE 53 refers to a CCITT event known to those skilled in this art and used by the layer two input filter task to pass I messages to the layer two two-dimensional multi-tasking input event filter task 44.

TRANSMIT I-FRAME MESSAGE 54 refers to a CCITT event known to those skilled in this art and used by the layer three conventional software routines to pass I messages to the layer two two-dimensional multi-tasking input event filter task 44 so that they may be transmitted to the ISDN line.

TEI REMOVE 55 is used by layer two itself to dispose of the logical association of a layer two/layer three entity with an assigned TEI when requested to do so by the network.

T200 EXPIRY 56, T202 EXPIRY 57 and T203 EXPIRY 58 are used by the task manager background timer activity to signal that a layer two timer has timed out.

UI TEI MESSAGE 59 is used by the layer two input filter task to pass UI TEI messages to the layer two two-dimensional multi-tasking input event filter task 44.

USID/TID ASSIGN 60, is from CCITT Q.932, a layer 3 protocol specification, but found to be more efficiently processed in layer 2 and is used by the layer two input filter task to pass USID/TID messages to the layer two two-dimensional multi-tasking input event filter task 44.

DM 61, DISC 62, UA 63, SABME 64 and FRMR 65 refer to CCITT events known to those skilled in this art and used by the layer two input filter task to pass tokens representing the respective U messages to the layer two two-dimensional multi-tasking input event filter task 44.

RR 66, RNR 67, and REJ 68 refer to CCITT events known to those skilled in this art and used by the layer two input filter task to pass tokens representing the respective S messages to the layer two two-dimensional multi-tasking input event filter task 44.

As can be seen from FIG. 4, there are four possible activities which may be encoded for each possible state and input event: D (Dispose message (legal but ignored)), I (Ignore), N (New state) and P (Process event and remain in same state). "Dispose" applies only to input events with accompanying messages and means that the message has no relevance, is unnecessary or illegal in the current layer 2 state and is disposed of. "Ignore" only applies to input events which do not have accompanying messages and means that there is no software routine for that particular event and state (and, by implication, the table entry is zero) and that the layer 2 two-dimensional multi-tasking input event filter task 44 is not awakened for that event. "New" and "Process" both mean that there is a software routine which corresponds to this cell in the matrix (and, by implication, a vector pointing to it). They differ in that cells marked "New" cause a change in the layer two state.

As is apparent from the above, input filter 42 separates out certain types of messages and multi-tasking filter 44 further separates certain messages based on their content. It can further be seen that by having a two-dimensional table to handle all possibilities for taking action for any layer two message and state, layer two functionally can be easily modified by simply altering the cell corresponding to the state and layer two message.

In accordance with the present invention, FIG. 5 depicts a detailed flow diagram of the WAIT subroutine 301 portion of the layer two two-dimensional multi-tasking input event filter 42 shown in FIG. 2 and the WAIT subroutine portion of the layer three two-dimensional multi-tasking input event filter 82 shown in FIG. 2.

The WAIT subroutine 301 is called by each routine in the two-dimensional multi-tasking input event filters 44,82 when each has finished its tasks. The WAIT subroutine either suspends the calling task or restarts it.

The WAIT subroutine 301 tests for queued input events in step 300 by comparing the two-dimensional multi-tasking input event filter input event queue counter to zero. If the counter is 0, the queue is empty and the calling task is suspended in step 302. If there is an input event in the queue, the routine fetches the current layer state in step 304, multiplies the state by the number of rows in the two-dimensional table at step 306 to calculate the two dimensional table index for the top of the column which corresponds to the current state, fetches the input event index from the input event queue in step 308, adds the input event index to the state-column index in step 310 and fetches the vector for the current state and input event from the two-dimensional table in step 312. The vector is compared to zero in step 314. If the vector is zero, the program jumps back to step 300.

If the vector is not zero, the subroutine call return address is popped off the stack in step 316 and the vector is added to the address of the base of the two-dimensional table to form the entry-point address of the routine that corresponds to the current state and input event and the routine is jumped to in step 318.

Even though the return address is never used, the WAIT subroutine is still called to keep the stack-frame consistent with all other task manager subroutine calls, which do use the return address to restart a task which is suspended upon calling the task manager.

In accordance with the present invention, FIG. 6 depicts a detailed flow diagram of the SIGNAL subroutine 401, which is used to signal an input event for the layer two two-dimensional multi-tasking input event filter 42 shown in FIG. 2 or the layer three two-dimensional multi-tasking input event filter 82 shown in FIG. 2.

The SIGNAL subroutine 401 tests to see if the two-dimensional multi-tasking input event filter task is running or suspended in step 400. If the task is running, the input event parameters are stored in the two-dimensional multi-tasking input event filter input event queue in step 402 and the subroutine returns to the calling task in step 424.

If the two-dimensional multi-tasking input event filter task is suspended, the routine fetches the current layer state in step 404, multiplies the state by the number of rows in the two-dimensional table at step 406 to calculate the two dimensional table index for the top of the column which corresponds to the current state, fetches the input event index from the input event queue in step 408, adds the input event index to the state-column index in step 410 and fetches the vector for the current state and input event from the two-dimensional table in step 412. The vector is compared to zero in step 414. If the vector is zero, the program jumps to step 424 and returns to the calling task. If the vector is not zero, the routine fetches a pointer to the suspended task registers in step 416, stores the input event parameters in the suspended task's registers in step 418. The vector is added to the address of the base of the two-dimensional table to form the entry-point address of the routine that corresponds to the current state and input event and that value is stored in the suspended task's PC in step 420. The suspended task is linked to the active task queue in step 422, so that it will be awakened by the task scheduler. The subroutine returns to the called task in step 424.

Figure 7:
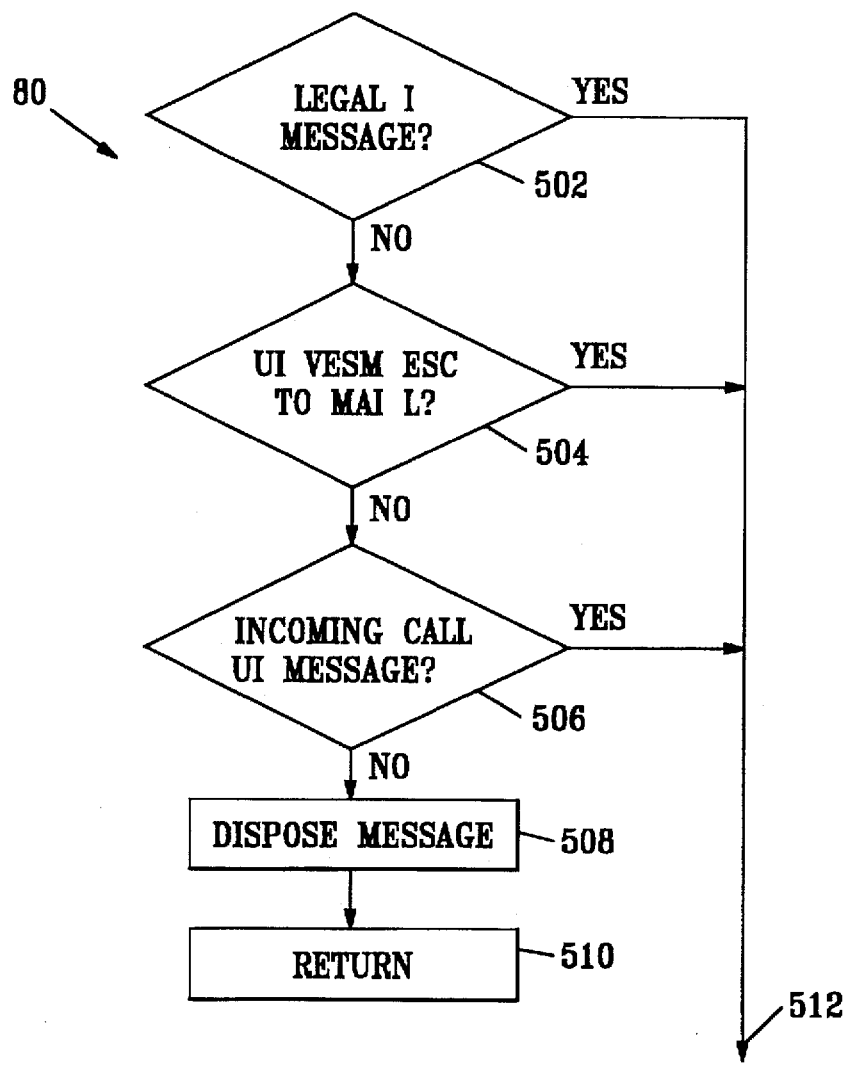
FIG. 7 is a flow chart of the layer three input filter subroutine.

In accordance with the present invention, FIG. 7 depicts a detailed flow diagram of the layer three conventional input filter subroutine 80 shown in FIG. 2. The layer three conventional input filter subroutine 80 is actually a pre-processing block for the layer three two-dimensional multi-tasking input event filter SIGNAL subroutine 401, which is run before the steps described above in the description of FIG. 6.

The layer three conventional input filter subroutine 80 tests the message to see if it is a legal I message in step 502. If it is a legal I message, the routine falls into the layer three two-dimensional multi-tasking input event filter SIGNAL subroutine 401 at step 512.

If the message is not a legal I message, it is checked in step 504 to see if it is a UI message with an embedded "Escape to National" IE. If it is a UI message with an embedded "Escape to National" IE, the routine falls into the layer three two-dimensional multi-tasking input event filter SIGNAL subroutine 401 at step 512.

If the message is not a UI message with an embedded "Escape to National" IE, it is checked in step 506 to see if it is a UI SETUP message which signifies an incoming call. If it is an incoming call message, the routine falls into the layer three two-dimensional multi-tasking input event filter SIGNAL subroutine 401 at step 512. Otherwise, the message is discarded in step 508 and the subroutine returns to the calling task in step 510.

In accordance with the present invention, FIG. 8 is an illustrative chart that depicts all layer three states, all layer three two-dimensional multi-tasking input event filter 82 input events and what action, if any, is taken by the layer three two-dimensional multi-tasking input event filter 82 for all possible combinations of layer three states and input events. This is useful to further understand the operation of the layer three two-dimensional multi-tasking input event filter 82 of FIG. 2.

Listed across the top of FIG. 8 are the layer three states of the present embodiment 84–95. It has been determined that the CALL PRESENT, INCOMING CALL PROCEEDING, DISCONNECT INDICATION and OVERLAP RECEIVE layer three states recommended in the CCITT Q.931 specification could be eliminated in the current embodiment. It was further determined that the SUSPEND REQUEST and RESUME REQUEST states should be replaced by the HOLD REQUEST and RETRIEVE REQUEST states recommended in the CCITT Q.932 specification, for North American requirements.

In the left column of FIG. 8 are the input events 100–138 to layer three of the present embodiment, which, preferably include the following set of input events to the layer three two-dimensional multi-tasking input event filter 82. These are believed to be required to establish and maintain D-channel communication, and the ones not set forth in the CCITT protocol are defined as follows:

ONHOOK 100 and OFFHOOK 101, conventional terms, are used by the user tasks to pass voice call telephone hook switch status to the layer three two-dimensional multi-tasking input event filter task 82.

B-CHANNEL RELEASE 102 and B-CHANNEL REQUEST 103, terms whose functions are implicit in their names, are used by the user tasks to pass data call telephone hook switch status to the layer three two-dimensional multi-tasking input event filter task 82.

DIAL 104, a conventional term, is used by the user tasks to pass dialed digits to the layer three two-dimensional multi-tasking input event filter task 82.

HOOKFLASH 105, a conventional term, is used by the user tasks to pass hookflash detection during voice calls to the layer three two-dimensional multi-tasking input event filter task 82.

DISABLE LAYER 3 109, a term whose whose function is implicit in its name, is used by the layer two two-dimensional multi-tasking input event filter task to disable layer three and reset the state machine to the NULL state in the event that layer 2 must reset itself to the GET TEI state.

UNEXPECTED I-FRAME 111 and UNRECOGNIZED I-FRAME 112, terms whose functions are implicit in their names, exist so that any received I message can be flagged as unexpected or unrecognized by any filter block in the discriminator chain merely by adjusting its input event index to correspond to one of these input events.

The remaining input events in the left column of FIG. 8 are extracted from all possible I and UI Q.931 and Q.932 message types and are the minimum set required to establish and maintain D-channel communication.

As can be seen from FIG. 8, there are five possible activities which may be encoded for each possible state and input event: "Discard", "Error", "Ignore", "New state" and "Process". Four of these activities have the same meanings as given in the descriptions for FIG. 4. "Error" means that there is a software routine which corresponds to this cell in the matrix (and, by implication, a vector pointing to it), but the routine does nothing but increment a counter and dispose of the message.

As may be seen from the above, the layer three input filter and multi-tasking filter also discriminate, or separate signals on the basis of message type and message content, similar to that in layer two.

In general, implementing the discriminator of the present invention increases the execution speed by reducing the number of tests which are performed to determine the viability of a specific input signal and the action to be taken. The tests required in conventional ISDN devices to test for illegal D-channel signals are eliminated altogether by the layer two and layer three filters which call the appropriate error routines. By funneling all tasks through this single set of filters, the program code is made smaller, faster and easier to debug. These features are believed to result in a lower cost/performance ratio than for any known ISDN device.

Figure 9:
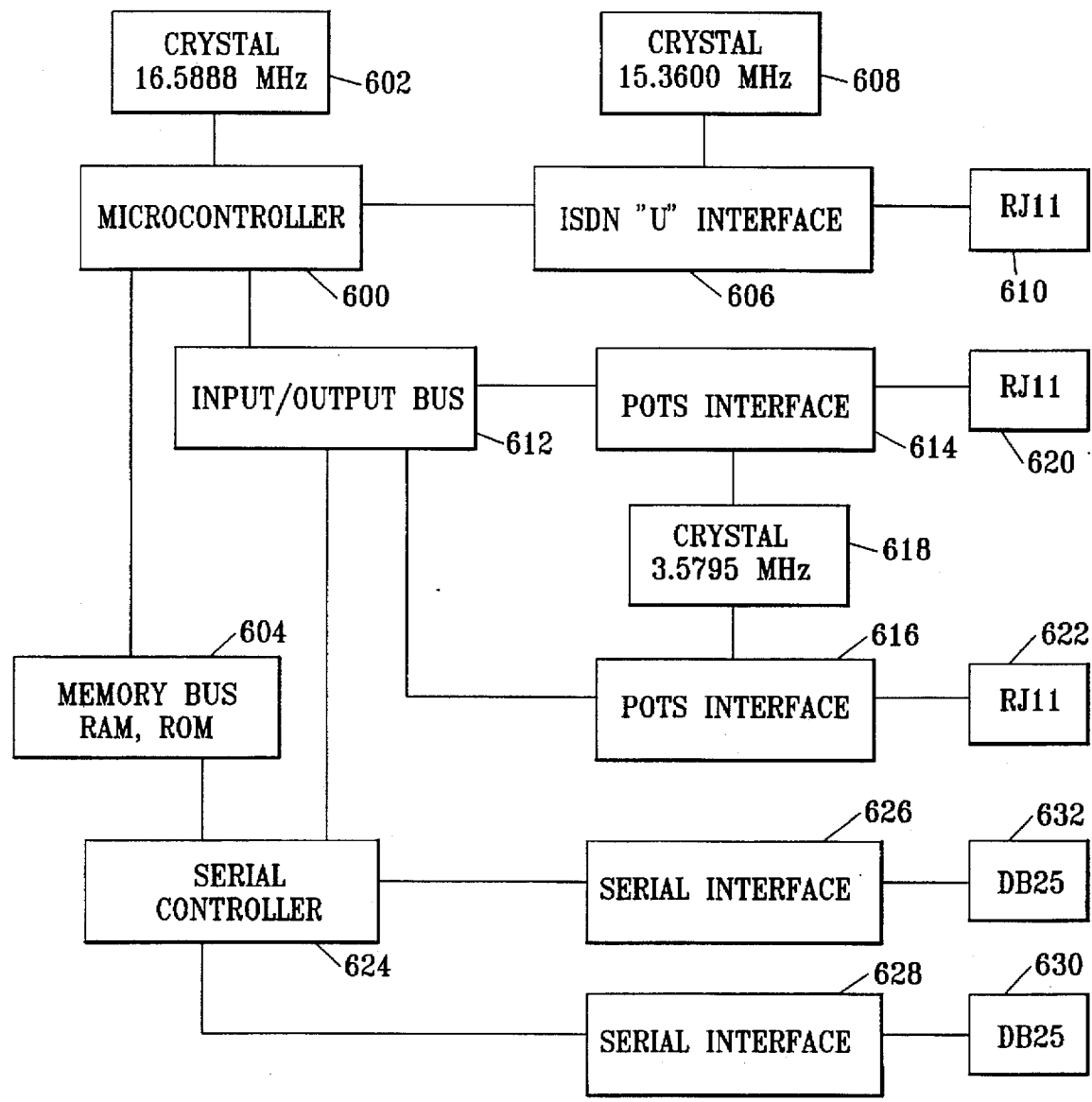
FIG. 9 is a block diagram of the major hardware components for the preferred embodiment.

In the presently preferred embodiment, the discriminator 37 is adapted for use in a terminal adapter. The hardware configuration typical for this type of ISDN device is illustrated by FIG. 9. The software is executed by a microcontroller 600 connected to a 16.588 MHz timing crystal 602. A microcontroller of the type suitable for this purpose is sold by Motorola of Austin, Tex. under model number MC68302. The terminal adapter software including the discriminator of the present invention is stored in conventional memory 604 which includes read-only memory (ROM) for the software and random access memory (RAM) for the program variables. A Flash ROM of the type suitable for this purpose is sold by ATMEL of San Jose, Calif. under model number AT29C1024. A RAM of the type suitable for this purpose is two 128K×8 static RAM sold by Samsung of South Korea. The microcontroller connects to the ISDN line through an ISDN "U" Interface 606 controlled by a 15.3600 MHz timing crystal and a conventional RJ11 modular phone jack 610. An ISDN "U" Interface of the type suitable for this purpose is sold by AT&T of Allentown, Pa. under model number T7256 and T7234. The ISDN "U" Interface handles the layer 1 hardware connection for the D-channel and B-channels of the ISDN line. The remainder of the hardware is user-end hardware which includes connections for two serial ports and two standard analog telephone jacks. The microcontroller connects to an I/O bus controller 612. The I/O bus provides digital communication to the microcontroller 600 and analog communication to a pair of analog telephone line POTS interfaces 614 and 616 both under the control of a 3.5795 MHz timing crystal 618. Each of the POTS Interfaces 614 and 616 connects to standard RJ11 phone jacks 620 and 622 respectively. An I/O of the type suitable for this purpose is sold by AMD of Sunnyvale, Calif. under model number AM27C02. A POTS Interface of the type suitable for this purpose is sold by Harris of Melbourne, Fla. under model number HA5513. The connection to the personal computer is handled by a serial controller 624 which connects to the memory 604 and I/O bus 612. A serial controller of the type suitable for this purpose is manufactured by Motorola of Austin, Tex. under model number MC68302. The serial controller handles all data throughput to the personal computer through a pair of RS-232, RS-422/530, V.35 serial transceivers 626 and 628 each connected to a conventional DB-25 serial connector.

For purposes of illustration the operation of the present invention, FIG. 10 illustrates the D-channel signal traffic needed to make a conventional telephone call over telephone lines serviced by ISDN terminal adaptors.

While the present invention has been described as applicable to the CCITT Q.921/Q931 protocol used with ISDN signaling, it is contemplated that the present invention can be readily adapted in a straight forward manner for use with other protocols which are similarly structured. Thus, the present invention can be utilized to achieve network equipment independence.

What has been disclosed is merely illustrative of the present invention. Other arrangements and methods can be implemented by those skilled in the art without departing from the spirit and scope of the present invention.

It will be understood that certain features and subcombinations are of utility and may be employed without reference to other features and subcombinations as they are outlined within the claims. While the preferred embodiment and application of the invention has been described, it is apparent to those skilled in the art that the objects and features of the present invention are only limited as set forth in the claims attached hereto.

We claim:

1. A multi-layer, computer program-implemented ISDN D-channel signaling discriminator system for establishing and maintaining communication on an ISDN line comprising:

a computing device having a memory;

an application program executable by said computing device and for performing a terminal initialization procedure for a connection on the ISDN line;

a data base in the memory including a matrix having a first axis with a set of predetermined states of operation which exist at various times during the initialization procedure and a second axis with a set of predetermined events which occur during the initialization procedure;

a routine in said application program for processing layer two messages transmitted on the D-channel of the ISDN line;

a layer two subroutine for receiving a message on the D-channel, for determining whether said message is legal and for accessing said database upon determination of a legal Information (I), Supervisory (S), or Unnumbered (U) message on the D-channel;

a plurality of predetermined subroutines, each subroutine of which is associated with a predetermined combination of one of said states and one of said events in said matrix in said data base;

whereby said layer two subroutine runs the one of said predetermined subroutines corresponding to the predetermined combination of the input event and the state of said message independent of the identity of the switch facility.

2. The ISDN discriminator system of claim 1 wherein said set of predetermined states includes at least one of the following:

Get TEI, Await est, Get USID, Await rel, Multi frm or Timer rec.

3. The ISDN discriminator system of claim 1 wherein said set or predetermined events includes at least one of the following:

Discard message, Rx I message, Tx I message, TEI remove, T200 expiry, T202 expiry, T203 expiry, UI TEI message, USID/TID assign, DM, DISC, UA, SABME, FRMR, RR, RNR or REJ.

4. A multi-layer, computer program-implemented ISDN D-channel signaling discriminator system for establishing and maintaining communication on an ISDN line comprising:

a computing device having a memory;

an application program executable by said computing device and for performing a terminal initialization procedure for a connection on the ISDN line;

a data base in the memory including a matrix having a first axis with a set of predetermined states of operation which exist at various times during the initialization procedure and a second axis with a set of predetermined events which occur during the initialization procedure;

a routine in said application program for processing layer three messages transmitted on the D-channel of the ISDN line;

a layer three subroutine for receiving a message on the D-channel and for accessing said data base;

a plurality of predetermined subroutines, each subroutine of which is associated with a predetermined combination of one of said states and one of said events in said matrix in said data base;

whereby said layer three subroutine runs the one of said predetermined subroutines corresponding to the input event and state of said message independent of the identity of the switch facility.

5. The ISDN discriminator system of claim 4 wherein said set of predetermined states includes at least one of the following:

Null, Call init, Ovlp send, Call Proc, Call delv, Call recv, Conn req, Active, Disc req, Hold req, Retrv req or Reles req.

6. The ISDN discriminator system of claim 5 wherein said set of predetermined events includes at least one of the following:

On hook, Off hook, B-channel release, B-channel request, Dial, Hookflash, T305 expiry, T308 expiry, T313 expiry, Disable Layer 3, Unexpected I-frame, Unrecognized I-frame, Escape to National, Alerting, Call proceeding, Progress, Setup, Connect, Setup ACK, Connect ACK, Disconnect, Release, Release complete, Hold request, Hold ACK, Hold reject, Retrieve request, Retrieve ACK, Retrieve reject, Status enquiry, Info, Status, Notify, User info, Restart, Restart ACK, Segment, Facility or Congestion control.

7. A multi-layer, computer program-implemented ISDN D-channel signaling discriminator system for establishing and maintaining communication on an ISDN line in response to received D-channel messages comprising:

a computing device having a memory;

an application program executable in said computing device and for performing a terminal initialization procedure for a connection on the ISDN line;

a two-dimensional table including:

a first row with a plurality of entries representative of predetermined states of operation within said initialization procedure and in a predetermined layer;

a first column with a plurality of entries representative of predetermined input events in said predetermined layer;

a plurality of predetermined subroutines, each subroutine being associated with each intersection of each row and each column of said data base; and, a routine in said application program for comparing an incoming event message transmitted on the D-channel and a state of the initialization procedure to a predetermined combination of incoming events and states in said data base and for running one of said subroutines upon making the comparison;

whereby said routine runs one of said predetermined subroutines associated with the intersection of each row and each column upon receipt of and in response to said received D-channel messages.

8. A computer program-implemented ISDN D-channel signaling discriminator, the improvement comprising:

a computing device having a memory;

an application program residing in said memory, executable by said computing device and for performing a multiple layer terminal initialization procedure;

a two-dimension data base including first, second and third types of data stored in said memory;

said first type of data representative of a plurality of predetermined states of operation arranged in a first row;

said second type of data representative of a plurality of predetermined input events arranged in a first column; and, said third type of data representative of the intersection of each row with each column;

said program, upon being connected to an ISDN switch facility and receiving from the facility incoming D-channel signals having current state and input event data, then associating said signals with the corresponding third type of data in said data base and running a predetermined subroutine:

whereby said discriminator completes the terminal initialization procedure independently of the identity of the switch of the facility to which it is connected.

9. A computer program-implemented ISDN D-channel signaling discriminator comprising:

a computing device having a memory;

an application program executable by said computing device and for receiving layer three messages from the D-channel of an ISDN line;

a two-dimension layer three data base including first, second and third types of data stored in said memory;

said first type of data representative of a plurality of predetermined layer three states arranged in a first row;

said second type of data representative of a plurality of predetermined layer three input events arranged in a first column; and said third type of data representative of the intersection of each row with each column;

a layer three subroutine for receiving current layer three input event data for a current layer three state, and for determining the data in said data base which corresponds to said current layer three input event during said current layer three state.

10. In a computer program-implemented ISDN D-channel signaling discriminator including a computing device having a memory, an application program executable by the computing device and for performing a terminal initialization procedure to establish a connection on an ISDN line, the improvement comprising:

a layer two data base stored in the memory and which associates each set of (i) one of a plurality of predetermined layer two states of operation and (ii) one of a plurality of layer two input events with one of a plurality of predetermined subroutines a layer three data base stored in the memory and which associates each set of (i) one of a plurality of predetermined layer three states of operation and (ii) one of a plurality of layer three input events with one of said plurality of predetermined subroutines a layer two filter subroutine which receives incoming layer two signals, compares the state and input event of the layer two signals with the layer two data base and upon making the comparison, runs the associated one of the predetermined subroutines, said layer two subroutine being in series with;

a layer three filter subroutine which receives incoming layer three signals, compares the state and input event of the layer three signals with the layer three data base and upon making the comparison, runs the associated one of the predetermined subroutines to form an ISDN signaling discriminator filter bank;

whereby said filter bank is adapted to process ISDN D-channel signals using any ISDN D-channel standard of any one of the group consisting essentially of CCITT, AT&T, Bellcore, Northern Telecom, Korean Telecom and Siemens.

11. The ISDN D-channel signaling discriminator of claim 10 further comprising:

a layer two input filter subroutine for distributing Information (I) messages to said layer two subroutine and to distribute Unnumbered Information (UI) messages to said layer three subroutine.

12. A method of processing ISDN D-channel signals by a computer, during a terminal initialization procedure for an ISDN connection including the steps of:

(a) receiving ISDN D-channel signals containing current Information (I), Supervisory (S), Unnumbered (U) and Unnumbered Information (UI) messages;

(b) distributing legal I, S and U messages to a layer two subroutine;

(c) distributing legal UI messages to a layer three subroutine;

(d) upon receipt of the current I, S or U message, the layer two subroutine accessing a layer two data base having data which associates one of a plurality of predetermined subroutines with each set of predetermined layer two input events and states;

(e) comparing the layer two current input event and state associated with the current message received to the data in the data base; and, (f) running the one predetermined subroutine which corresponds to the current state and input event.

13. The method of claim 12 further including the steps of:

(g) upon receipt of the current UI message, accessing a layer three data base having data which associates one of said predetermined subroutines with each set of sets of predetermined layer three input events and states;

(e) comparing the layer three current input event and state associated with the current message received to the data in the data base; and, (f) running the predetermined subroutine which corresponds to the current layer three input event and state.

14. An ISDN D-channel signaling discriminator system adapted for use in an ISDN device connected to at least one remote ISDN device through an ISDN switch facility, said system comprising:

a computing device having a memory;

an application program executable by said computing device and having a plurality of routines;

a layer two (Q.921) multi-tasking input event filter routine adapted to process incoming messages;

a layer three (Q.931) multi-tasking input event filter routine adapted to process incoming messages;

a layer two input filter routine adapted to distribute Information (I) messages to said layer two multi-tasking input event filter routine, to distribute indexes of Unnumbered (U) and Supervisory (S) messages to said layer two multi-tasking input event filter routine and to distribute Unnumbered information (UI) messages to said layer three multi-tasking input event filter routine; and a layer three input filter routine adapted to check for I messages and for UI messages.

15. The system of claim 14 further comprising:

said layer two multi-tasking input event filter routine including a layer two table adapted to associate the incoming I messages and the incoming indexes of U and S messages with predetermined layer two tasks related to establishing ISDN communication.

16. The system of claim 15 wherein said layer two table is adapted to associate said predetermined layer two tasks with predetermined layer two message processing subroutines and to ignore incoming messages from said layer two input filter not related to establishing ISDN communication.

17. The system of claim 15 further including:

a layer two wait subroutine adapted to queue said predetermined layer two message processing subroutines until one of said predetermined layer message processing subroutines is ready to process its associated message; and a layer two signal subroutine adapted to initiate processing of each said predetermined layer two message subroutine when ready.

18. The system of claim 14 further comprising:

said layer three multi-tasking input event filter routine including a layer three table adapted to associate the incoming UI messages with predetermined layer three tasks related to establishing ISDN communication.

19. The system of claim 18 wherein said layer three table is adapted to associate said predetermined layer three tasks with predetermined layer three message processing subroutines and to ignore incoming messages not related to establishing an ISDN communication.

20. The system of claim 18 further including:
 a layer three wait subroutine adapted to queue said predetermined layer three message processing subroutines until one of said predetermined layer three message processing subroutines is ready to process its associated message; and
 a layer three signal subroutine adapted to initiate processing of each said predetermined layer three message processing subroutine when ready.

21. The system of claim 15 wherein said layer two table further comprises:
 a two-dimensional vector table having;
  n number of rows with entries representative of all possible layer two states of operation, represented as n number of states of operation;
  m number of columns with entries representative of all possible input events, represented as m number of input events;
  said rows and columns defining an n×m matrix whereby each of the n states of operation is associated with each of the m input events such that each association of a state of operation with an input event corresponds to a software routine.

22. The system of claim 18 wherein said layer three table further comprises:
 a two-dimensional vector table having;
  z number of rows with entries representative of all possible layer three states of operation, represented as z number of states of operation;
  y number of columns with entries representative of all possible layer three input events, represented as y number of input events;
  said columns and rows defining a y×z matrix whereby each of the z states of operation is associated with each of the y input events such that each association of a state of operation with an input event corresponds to a software routine.

23. The system of claim 14 wherein said layer two input filter routine is further adapted to:
 be in suspension until a D-channel message is received from said ISDN line; and
 upon receipt of a message, test the value of the Terminal Endpoint Indentifier (TEI) byte of the received message to determine whether the TEI is global;
 for each global TEI, test the value of the Service Access Point Identifier (SAPI) to determine whether the SAPI is global;
 for each non-global SAPI, test to determine whether said message is a Management Information Message (MIM);
 discard each MIM message; and
 pass each non-MIM message to said layer three input filter routine.

24. The system of claim 14 wherein said layer two input filter routine is further adapted to:
 be in suspension until a D-channel message is received from said ISDN line; and
 upon receipt of a D-channel message, test the value of the Terminal Endpoint Identifier (TEI) byte of the received message to determine whether the TEI is global and test to determine whether the message is a UI message with a TEI remove request component;
 for each message with a TEI which is not global and for each message which has a TEI remove request component, compare the message TEI with predetermined TEIs to determine whether a match exists;
 when no said match exists, discard the message and when said match exists, pass each said message to said layer two multi-tasking filter routine.

25. A computer program-implemented method of processing ISDN D-channel signals which include messages comprising the steps of:
 providing a layer two input filter subroutine which is dormant unless awakened;
 receiving ISDN D-channel signals;
 waking up said layer two input filter subroutine upon receipt of a ISDN D-channel signal;
 identifying Unnumbered (U), Supervisory (S), Information (I) and Unnumbered information (UI) messages in the received ISDN D-channel signals;
 creating indexes for said U and said S messages;
 providing a layer two multi-tasking input event filter subroutine and a layer two two-dimensional state and input event matrix;
 processing said indexes in said layer two multi-tasking input event filter subroutine through use of said layer two two-dimensional state and input event matrix;
 processing signals containing said I messages in layer two through use of said layer two matrix;
 processing signals containing said UI messages by passing said signals to a layer three input filter;
 identifying signals to be processed as layer three signals;
 processing said signals in a layer three multi-tasking input event filter through use of a layer three two-dimensional state and input event matrix which includes a list of predetermined viable Information Elements (IE(s)) by;
 ignoring all of said signals which do not include an IE which matches any of said predetermined IEs and triggering conventional subroutines to further process in a conventional manner remaining layer three signals which correspond to predetermined layer three state and input events.

* * * * *